(12) United States Patent  (10) Patent No.: US 9,084,120 B2
Frei  (45) Date of Patent: Jul. 14, 2015

(54) SYSTEM AND METHOD FOR INTERFERENCE FREE OPERATION OF CO-LOCATED TRANSCEIVERS

(75) Inventor: Randy Frei, San Jose, CA (US)

(73) Assignee: Trilliant Networks Inc., Redwood City, CA (US)

( * ) Notice: Subject to any disclaimer, the term of this patent is extended or adjusted under 35 U.S.C. 154(b) by 893 days.

(21) Appl. No.: 13/219,143

(22) Filed: Aug. 26, 2011

(65) Prior Publication Data

US 2012/0052812 A1  Mar. 1, 2012

Related U.S. Application Data

(60) Provisional application No. 61/377,548, filed on Aug. 27, 2010.

(51) Int. Cl.
| | |
|---|---|
| H04B 1/00 | (2006.01) |
| H04W 16/14 | (2009.01) |
| H01Q 1/24 | (2006.01) |
| H01Q 21/06 | (2006.01) |
| H04W 72/04 | (2009.01) |

(52) U.S. Cl.
CPC .............. H04W 16/14 (2013.01); H01Q 1/241 (2013.01); H01Q 21/065 (2013.01); H04W 72/046 (2013.01); H04W 72/0446 (2013.01)

(58) Field of Classification Search
None
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,644,320 A | 2/1987 | Carr et al. | 340/12.37 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |

(Continued)

FOREIGN PATENT DOCUMENTS

| | | | | |
|---|---|---|---|---|
| EP | 0 578 041 B1 | 11/1999 | | H04L 12/56 |
| EP | 0 663 746 B1 | 1/2003 | | H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Nay A Maung
*Assistant Examiner* — Alejandro Rivero
(74) *Attorney, Agent, or Firm* — Moser Taboada

(57) ABSTRACT

Systems and methods for co-locating a plurality of transceivers capable of operating on the same frequency without interference are provided. The transmissions and/or receptions of the transceivers are coordinated in the time domain such that conflicting sectors are not utilized simultaneously, allowing for the transceivers to be physically located in close proximity without significant intra-system interference. The coordinating programs described herein allow for enhanced efficiency of spectral utilization as well as enhanced quality of service (QoS) through latency controls, rate control and traffic prioritization.

23 Claims, 5 Drawing Sheets

(56) References Cited

U.S. PATENT DOCUMENTS

| | | | |
|---|---|---|---|
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | 1/1 |
| 5,465,398 A | 11/1995 | Flammer | 455/69 |
| 5,467,345 A | 11/1995 | Cutler, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Ritter et al. | 370/338 |
| 5,572,438 A | 11/1996 | Ehlers et al. | 700/295 |
| 5,572,528 A | 11/1996 | Shuen | 370/254 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |

(56) References Cited

U.S. PATENT DOCUMENTS

| | | | |
|---|---|---|---|
| 6,711,166 B1 | 3/2004 | Amir et al. | 370/395.1 |
| 6,711,409 B1 | 3/2004 | Zavgren, Jr. et al. | 455/445 |
| 6,711,512 B2 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Meyer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | 717/168 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |

(56) References Cited

U.S. PATENT DOCUMENTS

| | | | |
|---|---|---|---|
| 7,788,491 B1 | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/328 |
| 7,847,706 B1 | 12/2010 | Ross et al. | 340/12.52 |
| 8,051,415 B2 | 11/2011 | Suzuki | 717/168 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0176381 A1* | 11/2002 | Hammel et al. | 370/329 |
| 2002/0186619 A1 | 12/2002 | Reeves et al. | 368/47 |
| 2003/0001640 A1 | 1/2003 | Lao et al. | 327/141 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/338 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0263390 A1* | 12/2004 | Merenda et al. | 343/700 MS |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki et al. | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |

(56) References Cited

U.S. PATENT DOCUMENTS

| | | | |
|---|---|---|---|
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0137620 A1* | 6/2008 | Wang et al. | 370/337 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.02 |
| 2008/0283620 A1 | 11/2008 | Knapp | 236/12.16 |
| 2008/0310311 A1 | 12/2008 | Flammer et al. | 370/238 |
| 2008/0310346 A1* | 12/2008 | Rich et al. | 370/328 |
| 2008/0310377 A1 | 12/2008 | Flammer et al. | 370/338 |
| 2008/0317401 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0059794 A1* | 3/2009 | Frei | 370/235 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakraborty et al. | 379/201.03 |
| 2009/0132220 A1 | 5/2009 | Chakraborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1 | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0195593 A1* | 8/2010 | Denteneer et al. | 370/329 |
| 2010/0238917 A1 | 9/2010 | Silverman et al. | 370/350 |
| 2010/0256830 A1 | 10/2010 | Kressner et al. | 700/291 |
| 2011/0004358 A1 | 1/2011 | Pollack et al. | 700/297 |
| 2011/0035073 A1 | 2/2011 | Ozog | 700/291 |
| 2011/0066297 A1 | 3/2011 | Saberi et al. | 700/287 |

FOREIGN PATENT DOCUMENTS

| | | | |
|---|---|---|---|
| EP | 0 812 502 B1 | 8/2004 | H04L 12/28 |
| EP | 0 740 873 B1 | 12/2005 | H04L 12/44 |
| JP | 10-070774 | 3/1998 | H04Q 5/00 |
| JP | 10-135965 | 5/1998 | H04L 12/28 |
| WO | WO 95/12942 | 5/1995 | H04L 12/44 |
| WO | WO 96/10307 | 4/1996 | H04L 12/28 |
| WO | WO 96/10307 A1 | 4/1996 | H04L 12/28 |
| WO | WO 00/54237 | 9/2000 | G08B 23/00 |
| WO | WO 01/26334 A2 | 4/2001 | H04L 29/06 |
| WO | WO 01/55865 | 8/2001 | G06F 13/00 |
| WO | WO 03/015452 | 2/2003 | H04Q 9/00 |
| WO | WO 2005/091303 | 9/2005 | G06F 9/445 |
| WO | WO 2006/059195 | 6/2006 | G05D 3/12 |
| WO | WO 2007/015822 | 8/2007 | H04L 12/28 |
| WO | WO 2007/132473 | 11/2007 | G08C 17/00 |
| WO | WO 2008/027457 | 3/2008 | G08B 23/00 |
| WO | WO 2008/033287 A2 | 3/2008 | G08B 23/00 |
| WO | WO 2008/033514 A2 | 3/2008 | G08B 25/00 |
| WO | WO 2008/038072 | 4/2008 | H04Q 7/24 |
| WO | WO 2008/092268 A1 | 8/2008 | G01D 7/06 |
| WO | WO 2009/067251 | 5/2009 | G08C 19/00 |

OTHER PUBLICATIONS

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

(56) References Cited

OTHER PUBLICATIONS

Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department*, University of California, Berkeley, 12 pp., 1996.
Johnson, David B., "Routing in Ad Hoc Networks of Mobile Hosts," *IEEE*, pp. 158-163, 1995.

Nachum Shacham, Edwin B. Brownrigg, & Clifford A. Lynch, *A Packet Radio Network For Library Automation*, 1987 IEEE Military Communications Conference, vol. 2 at 21.3.1, (Oct. 1987).
Nachum Shacham & Janet D. Tornow, Future Directions in Packet Radio Technology, Proc. of the IEEE Infocom 1985 at 93 (Mar. 1985). 17 pp.
John Jubin & Janet D. Tornow, The DARPA Packet Radio Network Protocols, Proc. of the IEEE, vol. 75, No. 1 at 21 (Jan. 87).
John Jubin, Current Packet Radio Network Protocols, Proc. of the IEEE Infocom1985 at 86 (Mar. 1985), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.
David B. Johnson, Mobile Host Internetworking Using IP Loose Source Routing, Carnegie Mellon University CMU-CS-93-128, DARPA Order No. 7330 (Feb. 1993), 18 pp.
Daniel M. Frank, Transmission of IP Datagrams Over NET/ROM Networks, Proc. of the ARRL 7th Computer Networking Conference 1988 at 65 (Oct. 1988), 6 pp.
Robert E. Kahn, et al., Advances in Packet Radio Technology, Proc. of the IEEE, vol. 66, No. 11, pp. 1468-1496 (Nov. 1978).
Clifford A. Lynch & Edwin B. Brownrigg, Packet Radio Networks, Bergamon Press, 259-74 (1987).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.
Nachum Shacham & Jil Westcott, Future Directions in Packet Radio Architectures and Protocols, Proc. of the IEEE, vol. 75, No. 1 at 83 (Jan. 1987), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.
John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.
Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.

(56) References Cited

OTHER PUBLICATIONS

Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13 ,Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, *Route Optimization and Locations Updates for Mobile Hosts*, Proceedings of the 16$^{th}$ ICDCS, p. 319-326, 1996.
Daniel Cohen, Jonathan B. Postel, and Raphael Rom, *IP Addressing and Routing in a Local Wireless Network*, IEEE INFOCOM 1992, p. 5A.3.1-7.
Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009).
Jonathan J. Hahn and David M. Stolle, *Packet Radio Network Routing Algorithms: A Survey*, IEEE Communications Magazine, vol. 22, No. 11, p. 41-7, Nov. 1984.
David A. Hall, *Tactical Internet System Architecture for the Task Force XXI*, IEEE 1996, p. 219-30.
Robert Hinden and Alan Sheltzer, *The DARPA Internet Gateway*, DARPA RFC 823, Sep. 1982, 45 pp.
Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.
David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.
David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.
Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.
Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.
Charles E. Perkins and Pravin Bhagwat, *A Mobile Networking System Based on Internet Protocol*, IEEE Personal Communications, First Quarter 1994, IEEE 1994, p. 32-41.
Richard Schulman, Richard Snyder, and Larry J. Williams, *SINCGARS Internet Controller-Heart of the Digitized Battlefield*, Proceedings of the 1996 Tactical Communications Conference, Apr. 30-May 2, 1996, Fort Wayne, Indiana, p. 417-21.
Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.
Carl A. Sunshine, *Addressing Problems in Multi-Network Systems*, Proceedings of INFOCOM 1982, IEEE 1982, p. 12-18.
J.J. Garcia-Luna-Aceves, *Routing Management in Very Large-Scale Networks*, North-Holland, Future Generations Computer Systems 4, 1988, pp. 81-93.
J.J. Garcia-Luna-Aceves, *A Minimum-hop Routing Algorithm Based on Distributed Information*, North-Holland, Computer Networks and ISDN Systems 16, 1988/1989, p. 367-382.
D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.
Jens Zander and Robert Forchheimer, *The SOFTNET Project: A Retrospect*, IEEE EUROCON, Jun. 13-17, 1988, p. 343-5.
Mario Gerla and Jack Tzu-Chich Tsai, *Multicluster, Mobile, Multimedia Radio Network*, Wireless Networks 1, J.C. Baltzer AG, Science Publishers, 1995, p. 255-265.
F. G. Harrison, *Microwave Radio in the British TeleCom Access Network*, Second IEE National Conference on Telecommunications, Conference Publication No. 300, Apr. 2-5, 1989, p. 208-13.
Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.
Fadi F. Wahhab, *Multi-Path Routing Protocol for Rapidly Deployable Radio Networks*, Thesis submitted to the Department of Electrical Engineering and Computer Science of the University of Kansas, 1994, 59 pp.
Jil Westcott and Gregory Lauer, *Hierarchical Routing for Very Large Networks*, IEEE MILCOM 1984, Oct. 21-24, 1984, Conference Record vol. 2, p. 214-8
International Search Report and Written Opinion for Application No. PCT/US08/13019, dated Jan. 12, 2009, 13 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).

(56) References Cited

OTHER PUBLICATIONS

Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, Ch, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietf.org/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks,"Modeling, Analysis and Simulation of Computer and Telecommunications Systems, $10^{th}$ IEEE Proceedings on Mascots, Oct. 11-16, 2002, Piscataway, NJ (XP010624424) (ISNB: 978-0-7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

International Search Report and Written Opinion for Application No. PCT/US2011/060694, dated Apr. 9, 2012, 10 pp.

International Search Report and Written Opinion for Application No. PCT/US12/22334, dated Apr. 9, 2012, 9 pp.

International Search Report and Written Opinion for Application No. PCT/US11/56620, dated Mar. 13, 2012, 8 pp.

Supplementary European Search Report for Application No. EP 08 84 2449, dated Nov. 29, 2011, 5 pp.

Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.

Telegesis, "ZigBee Gateway Makes Your Meter Smart" [online], 2005 [retrieved on Feb. 16, 2012], 1 p., Retrieved From the Internet: http://www.telegesis.com/downloads/general/
SSV%20IP%20gateway%20case%20study.pdf.

Supplementary European Search Report for Application No. EP 09 81 1849, dated Dec. 13, 2011, 9 pp.

Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.

International Search Report and Written Opinion for Application No. PCT/US2011/049277, dated Jan. 31, 2012, 9 pp.

International Search Report and Written Opinion for Application No. PCT/US11/21167, dated Mar. 21, 2012, 8 pp.

"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.

"ZigBee Smart Energy Profile Specification," ZigBee Profile: 0x0109, Revision 15, Dec. 1, 2008, Document 075345r15 (SEP Document), 244 pp.

Edison Electric Institute (EEI), "Uniform Business Practices for Unbundled Electricity Metering, vol. Two," Dec. 5, 2000, 196 pp., www.naesb.org/pdf/ubp120500.pdf.

"ZigBee Smart Energy Profile Specification," ZigBee Profile: 0x0109, Revision 16, Version 1.1, Document 075356r16ZB, 332 pp., Mar. 23, 2011.

"ZigBee Over-the-Air Upgrading Cluster," ZigBee Alliance, Document 095264r18, Revision 18, Version 1.0, 63 pp., Mar. 14, 2010.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.

"ZigBee Cluster Library Specification," ZigBee Alliance, Document 075123r02ZB, 420 pp., May 29, 2008.

Liu, Ryan, et al., "A Survey of PEV Impacts on Electric Utilities," *EEE PES Innovative Smart Grid Technologies Conference*, Anaheim, California, 8 pp., Jan. 17-19, 2011.

"Utility/Lab Workshop on PV Technology and Systems," DTE Energy DER Technology Adoption, DEW Analysis of Renewable, PEV & Storage, Tempe, Arizona, 36 pp., Nov. 8-9, 2010.

"Network Device: Gateway Specification," ZigBee Alliance, ZigBee Document 075468r35, Revision 35, Version No. 1.0, 301 pp., Mar. 23, 2011.

International Search Report and Written Opinion for Application No. PCT/US12/28135, dated Jul. 5, 2012, 7 pp.

\* cited by examiner

SYSTEM AND METHOD FOR INTERFERENCE FREE OPERATION OF CO-LOCATED TRANSCEIVERS

CROSS-REFERENCE TO RELATED APPLICATIONS

The present application claims benefit of similarly titled U.S. provisional patent application Ser. No. 61/377,548 filed Aug. 27, 2010, which is incorporated herein by reference in its entirety.

FIELD OF THE INVENTION

The present invention is directed to a system and method for co-locating a plurality of transceivers that can operate on the same frequency without interference. More specifically, the invention is directed to a system and method for coordinating communications of multiple, co-located transceivers, to allow the transceivers to be physically located in close proximity without causing significant intra-system interference.

BACKGROUND OF THE INVENTION

As consumer appetite for multimedia content continues to grow, internet service providers are struggling to provide sufficient bandwidth. Although wired solutions, such as T1 lines, digital subscriber lines (DSL), and cable modems, are becoming ubiquitous in urban environments, these systems are presently not available to a significant portion of the population. Moreover, acquisition and installation costs associated with these systems make them less appealing One system that provides a fixed wireless solution with bandwidth comparable to DSL and cable modem technologies is a mesh network architecture. As described in, for example, commonly owned U.S. patent application Ser. Nos. 12/554,135 and 12/275,282, each of which are incorporated herein by reference in their entirety, a mesh network comprises a plurality of wirelessly connected nodes that communicate data traffic across a wide area. The nodes of a mesh network communicate with one another using radio or microwave communications signals One of the most effective tools to improve wireless links, such as connections between nodes in a mesh network, is the use of directional antennas. The benefits of directional antennas include higher modulation and longer range; decreased interference susceptibility from external sources; decreased interference to other systems; and increased power due to point-to-point regulations in many countries. Despite these advantages, directional antennas are difficult to employ because they must be precisely aligned with a complementary antenna and/or many mesh networks require 360° coverage.

In those mesh networks where it is desirable to have 360° omnidirectional coverage, a plurality of directional antennas must be employed. Unfortunately, the use of multiple directional antennas in close proximity is difficult to implement, as such systems experience debilitating intra-system interference. Thus, co-located wireless directional antennas are normally assigned to different non-interfering frequencies, or are installed with sufficient physical or spatial isolation to avoid interference. Both of these situations negatively impact performance and/or impose installation challenges.

It would therefore be desirable to design a system comprising multiple, co-located directional antennas that operate on a single frequency without significant intra-system interference.

SUMMARY OF THE INVENTION

In order to maximize bandwidth capacity at a single location, and to allow easier installation, the exemplary embodiments described herein employ multiple panel devices along with processor implemented scheduling software to coordinate communications to and from each panel. This allows multiple co-located panels to dynamically use their sectors in an interference free manner, while being able to operate on a single frequency.

In one aspect of the invention, a panel system is provided. The panel system includes a first panel device having a processor, a transmitter, and a receiver. The first panel device transmits and/or receives a first beam along a first sector chosen from a plurality of first sectors defining a first beam arc. The panel system also includes a second panel device co-located with the first panel device (e.g., located adjacent to the first panel device). The second panel device typically includes a processor, a transmitter, and a receiver such that the second panel device is capable of transmitting and/or receiving a second beam along a second sector chosen from a plurality of second sectors defining a second beam arc. Typically, the first sector is located such that the transmitting and/or receiving of the first beam by the first panel device along the first sector would interfere with the transmitting and/or receiving of the second beam by the second panel device along the second sector. However, such interference is prevented, as the first panel device and second panel device are coordinated in the time domain to prevent the transmitting and/or receiving of the second beam along the second sector when the first panel device is transmitting and/or receiving the first beam along the first sector.

The second panel device of the multi-panel system is typically not prevented from transmitting and/or receiving along any of the plurality of second sectors that do not interfere with the first sector. The first panel device and/or second panel device of the system may include an array of antenna elements. Moreover, the first panel device and/or second panel device of the system may be a directional antenna.

These and other aspects of the invention will be better understood by reading the following detailed description and appended claims.

DETAILED DESCRIPTION OF INVENTION

As described below, the methods and systems of the invention employ multiple panel devices along with processor implemented coordinating software to schedule communications (e.g., transmissions and/or receptions) in the time domain to and from each panel. This allows multiple co-located panels to dynamically send and receive data, without debilitating interference, and despite close proximity. The coordinating programs described herein allow for enhanced efficiency of spectral utilization as well as enhanced quality of service (QoS) through latency controls, rate control and traffic prioritization.

As used throughout, the terms "panel" and "transceiver" are employed interchangeably. Typically, the panels of the invention are capable of transmitting and/or receiving analog and/or digital signals. Moreover, the panels described herein typically comprise a transmitter, a receiver, a memory, a power circuit, and a processor. It is an object of the invention to allow multiple panels to be co-located and interconnected, while preventing interference. For example, multiple panels may be mounted on rooftops, walls, or windows, in such a geometry as to allow for 360° omnidirectional coverage. The panels may be adapted to communicate with any mesh node that is within line-of-sight to the mounting location.

The term "time slot" or "communication slot," as described herein, refers to a given amount of time during which a panel will send or receive a signal. Although the invention is described in terms of coordinating panel sectors in the time domain, it will be understood that other types of communication spaces may be used, including without limitation, codes, channels, and the like.

Figure 1:
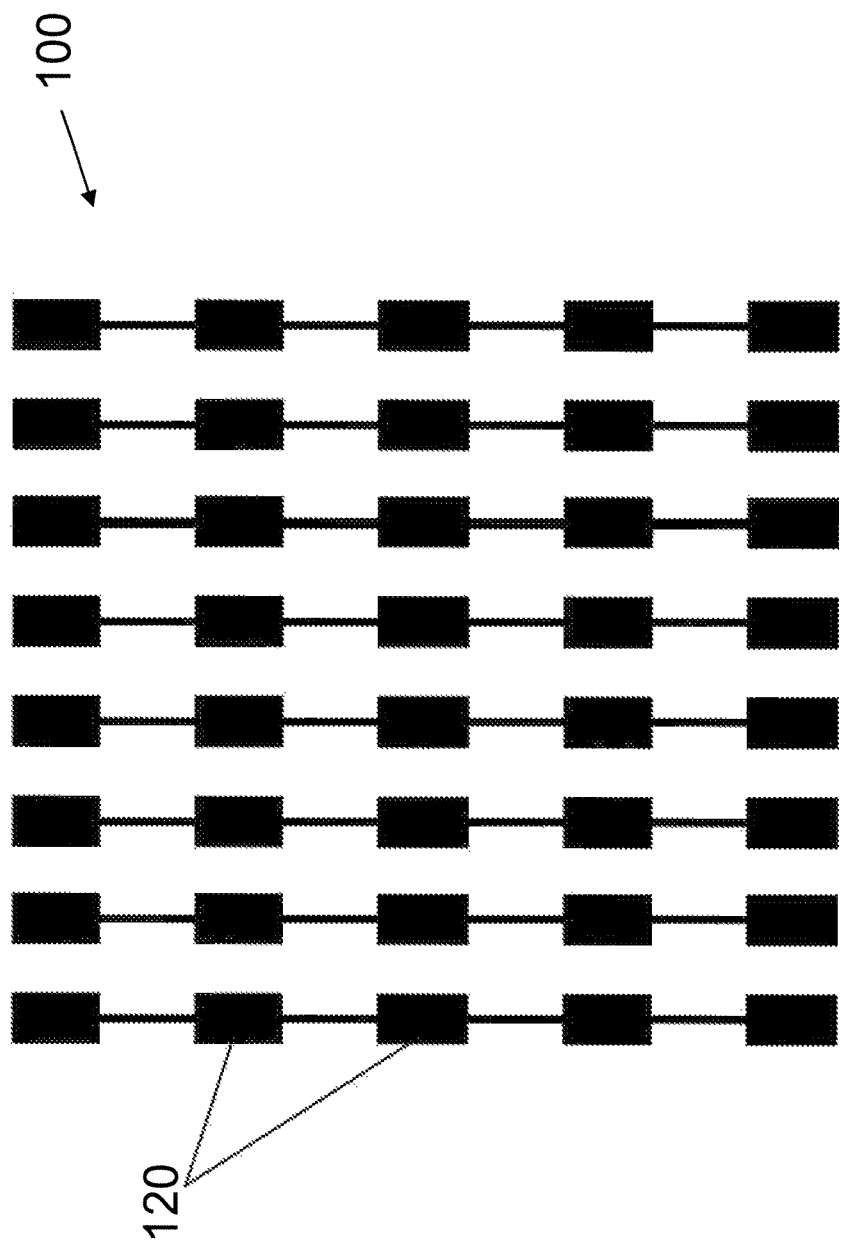
FIG. 1 shows a panel device configuration which may be used in accordance with embodiments described herein.

Referring to FIG. 1, an exemplary panel 100 which may be used in the embodiments described herein is shown. The panel 100 comprises an array of individual antenna elements (e.g., 120), as shown and described in detail in commonly owned U.S. Pat. No. 7,053,853, the entire contents of which are incorporated herein by reference. The panel 100 may produce a single, directional beam that may be switched in a multitude of directions to connect to various nodes.

In one embodiment, the panel 100 comprises an RF feed circuit, a processor, a transmitter, a receiver, and/or a power circuit. For example, the RF feed circuit of a panel may allow for a beam having the maximum allowable FCC output power of 1 Watt to be produced at 23 dBi of gain. The panel typically operates (i.e., receives and/or transmits) at approximately 5.8 GHz (e.g., frequencies within the UNII band). Moreover, each panel typically includes a processor to facilitate coordination calculations and scheduling information transfer between multiple panel devices as described herein.

One skilled in the art recognizes that the coordinating techniques described herein may be employed with panels having any number of differently configured panels. For example, the particular panel configuration shown in FIG. 1 produces a beam having a horizontal width of about 15 degrees and a vertical width of about 6 degrees. The beam may be steerable across a 90 degree coverage arc by changing the phase of the signal at a panel and the panel design supports a very fine level of granularity in horizontal steering (e.g., a minimum of an about 3° increment).

The exemplary panel of FIG. 1 comprises an M×N array of individual antenna elements (e.g., radiating patches), wherein M=8 and N=5. In other embodiments, the panel device may include antenna elements in arrays of M=1 to 10 by N=1 to 10. In any event, the number of antenna elements in each column typically determines the vertical beam width of the antenna, and the columns are typically spaced one half wavelength apart to provide for optimum side-lobe levels. It will be appreciated that panels comprising any type of radiating elements may be employed in the invention, such as but not limited to those that comprise slots, dipoles or other apertures.

In exemplary panels described in U.S. Pat. No. 7,053,853, an RF signal is fed through a power divider, then phase shifters (to control the beam shape), then an amplifier and T/R (transmit/receive) switch for each of eight element arrays. The output power of the device is equal to the combined output power of the eight elements, which allows for better steering and lower distortion while increasing the delivered output power to the maximum allowable.

Figure 2:
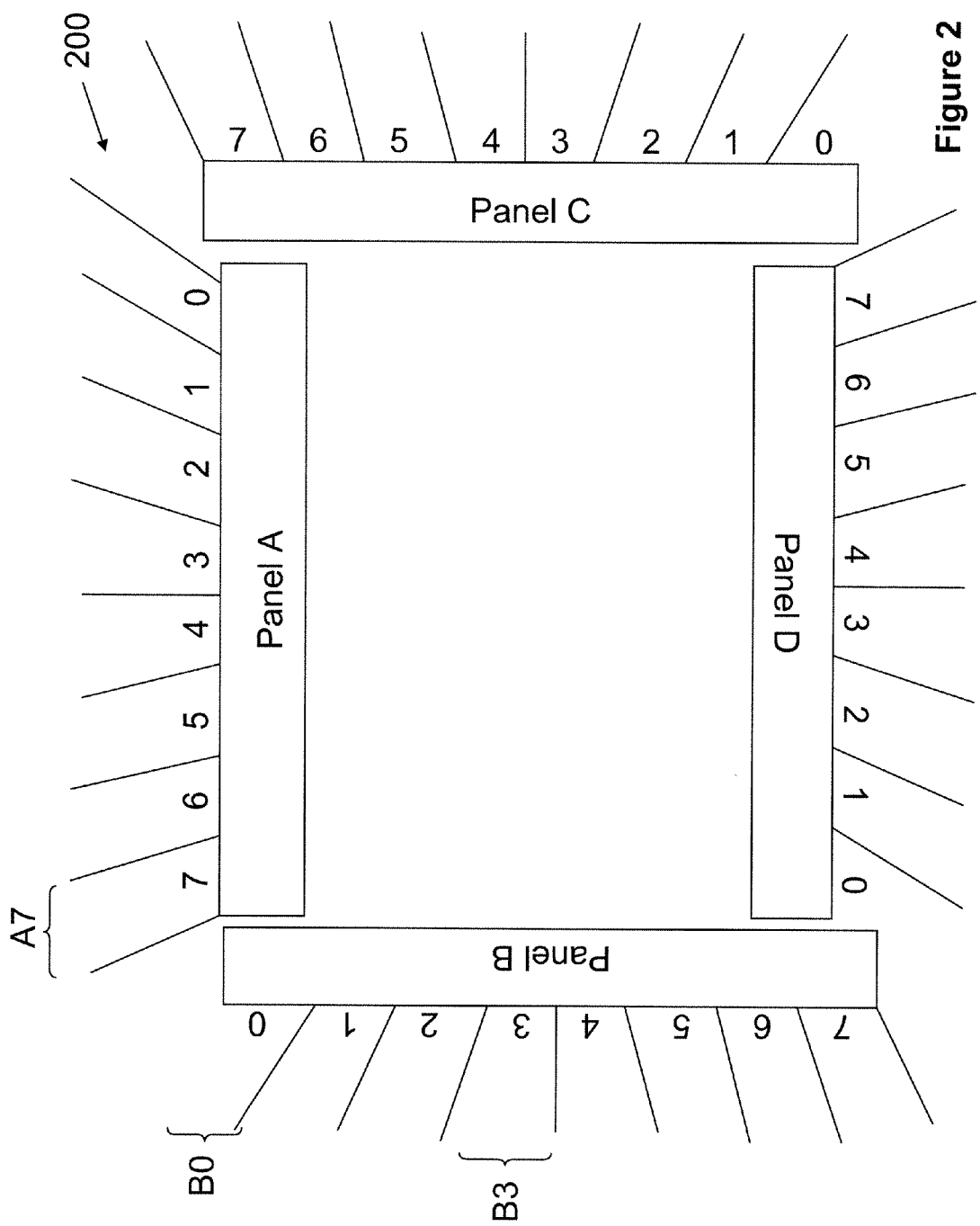
FIG. 2 illustrates an exemplary system comprising multiple, co-located panels in accordance with an embodiment described herein.

Referring to FIG. 2, an exemplary panel system 200 is illustrated comprising four co-located panel devices (A-D), such as the panels shown and described with respect to FIG. 1. As shown, the panels are each able to steer a beam over a 90 degree arc, which is divided into any number of sectors having a given width. For example, the arcs shown in FIG. 2 are divided into eight sectors (0-7), each spanning about 15 degrees in width. Accordingly, when a panel produces a beam having approximately the same width of a sector, the panel may be said to "use" that sector when it transmits or receives a beam along that sector. In the illustrated exemplary embodiment, the panel (e.g., Panel A) produces a 15 degree wide beam, which may be directed along any of sectors 0-7.

It will be recognized that, although eight sectors are shown, the invention is not so limited. Typically, the number of sectors will relate to the width of the beam produced by a panel and the total arc used by the panel. For example, if a panel produces a 30 degree wide beam and is capable of steering the beam across a 90 degree arc, the arc may be split into three sectors, each spanning about 30 degrees.

In any event, as shown, each of the panel devices (A-D) are physically independent from one another, but are located in close proximity. In fact, the coordination methods of the invention allow for multiple panels to be separated by less than 10 ft., less than 5 ft., less than 2 ft., or even less than a 1 ft, without the need for significant RF isolation or the need for each panel to operate on a different frequency (although either or both may be implemented in exemplary systems). One skilled in the art recognizes that, while four panels are co-located in the present example, the co-location of fewer or greater individual panel devices is possible.

Typically, the panels (A-D) are employed in a geometry that allows for the transmittal and/or reception of beams by a first panel that have the potential to interfere with adjacent panels. For example, in the illustrated embodiment, signals emitted along sector 7 of Panel A (A7) and sector 0 of Panel B (B0) are capable of interfering with each other because of their close proximity. By contrast, signals emitted and/or received along sectors A7 and B3 would not typically interfere with each other, because of the distance and direction of these sectors.

Accordingly, the panels must be coordinated as to prevent the panels from transmitting and/or receiving along conflicting sectors at the same time. The programs of the invention coordinate operation of the panel system 200, including the individual panel devices therein (A-D), to prevent this type of interfering operation. In one embodiment, usage of each sectors is only allowed during a scheduled time slot. For instance, when Panel A communicates on its sector A7, Panel B would be prevented from using its sector B0, but would be allowed to transmit or receive a signal on a non-interfering sector such as, for example, sector B3.

In order to properly coordinate the multiple panels of a system, certain panel geometries are typically implemented. First, the panels (A-D) are positioned such that a sector only interferes with one or more sectors of a single other panel. Stated another way, a single sector will not interfere with sectors of multiple panels. As an example, if sector A7 interferes with B0, then sector A7 should not interfere with any sectors of Panel C or Panel D.

The panels are also positioned such that not every sector of a first panel interferes with every sector of an adjacent panel. Therefore, the panel systems will comprise adjacently located panels having one or more interference-free sectors. As an example, Panel B will comprise at least one sector (e.g., B3) that does not interfere with at least one sector of Panel A (e.g., A7). Moreover, because adjacent sectors on different panels (e.g, B0 and A7) are capable of operating at similar or identical frequencies, each panel is typically coordinated with at least two other panels. For example, Panel B will be coordinated with at least Panels A and C.

In order to carry out effective coordinating via time slot scheduling (described in detail below), each of the coordinated panels will typically share a synchronized clock. It will be appreciated that such synchronization is required to accurately schedule emission/transmission for each panel during a particular time slot.

In addition to the above panel geometries, the coordination of panels is typically determined according to a number of simplifying assumptions. For example, the system may assume that interference caused by additive signals (i.e., a signal comprising two or more signals from different source panels) is negligible. Accordingly, in one embodiment, the system does not account for additive signals when coordinating panels. For example, an additive signal comprising noise from sectors 7 of Panel B and sector 0 of Panel D would not be taken into account when coordinating sector 3 of Panel C. Although it is preferred to employ such a simplifying assumption to reduce processing power requirements and processing time, in some embodiments, any additive signals may, in fact, be considered when coordinating panels.

In one embodiment, each of the above panel geometries and simplifying assumptions may be tested prior to deployment. The panels of the system are typically able to test each other in order to determine if they are sufficiently isolated, and this testing is determined through either an automatic sequence test or a manual configuration.

Messaging

In order to coordinate the transmission and/or emission along sectors of multiple panels, the panels (A-D) are generally capable of communicating and exchanging data with each other. In one embodiment, the panel system 200 initiates a data exchange process when the system is powered up, wherein each individual panel device (A-D) discovers the existence, location, and/or other panel information of the other panel devices in the system through frame exchanges. The data exchange process is typically automatically initiated upon power-up of the system 200, before transmissions to non-co-located panels are made, but may alternatively or additionally be initiated manually or as part of the normal operation of the panel data exchanges.

During the data exchange processes, the panel devices (A-D) exchange panel information, such as but not limited to which sectors (0-7) are being utilized, whether the sectors interfere with those of adjacent panels, and the utilization rate desired or required for each sector. Moreover, the signal quality between each of the panels (A-D) may be determined and communicated.

In certain embodiments, the data exchange is performed among panels using broadcast messages, but in a preferred embodiment, a three-way handshake adjacent panels is employed. Of course, there are many implementations for executing data exchanges between multiple panels, and in one embodiment, a two-way handshake could alternatively be used.

An exemplary three-way handshake is described in detail below, where a first panel (Panel 1) negotiates the parameters of the network TCP socket connection before beginning communication with a second panel (Panel 2). The three-way handshake includes a Demand Info Tx from Panel 1 to Panel 2 desiring to use the same sector. For purposes of orientation and coordination, as between two panels, the initiating panel may be determined based on left-right location (i.e., the panel to the right is always Panel 1). Alternatively, the panel with the lowest MAC address may be designated Panel 1.

The Demand Info Tx includes, but is not limited to, the data show in Table 1 from Panel 1, and is typically in the form of an XML message:

TABLE 1

Demand Info Tx

| Variable | Explanation |
| --- | --- |
| $ID_M$ | Message identifier. Typically incremented by an integer value (e.g., 1) in accordance with a panel-specific, randomly generated sequence number. |
| $Demand_1$ | Normalized number of interfering sectors required by Panel 1 |
| Local Sectors$_1$ | Interfering sectors of Panel 1 required to send the Message. The sectors are typically numbered right-to-left from 0-7, where the right-most sector is 0 |
| Remote Sectors$_1$ | Interfering sectors of Panel 2. The sectors are typically numbered right-to-left from 0-7, where the right-most sector is 0 |

In response to a received Demand Info Tx from Panel A, Panel B responds with a Demand Info Rx that includes, but is not limited to, the data shown in Table 2.

TABLE 2

Demand Info Rx

| Variable | Explanation |
| --- | --- |
| $ID_M$ | The same Message Identifier as the Demand Info Tx |
| $Demand_2$ | Normalized number of interfering sectors required by Panel 2 |
| Local Sectors$_2$ | Interfering sectors of Panel 2 required to send the Message. The sectors are typically numbered right-to-left from 0-7, where the right-most sector is 0 |
| Remote Sectors$_2$ | Interfering sectors of Panel 1. The sectors are typically numbered right-to-left from 0-7, where the right-most sector is 0 |

Once Panel 1 receives the Demand Info Rx from Panel 2, Panel 1 sends an Acknowledgement Message. In one embodiment, the Acknowledgement Message may simply contain the $ID_M$.

Importantly, the Local and Remote Sector interference information seen by Panel 1 may not be the same as the Local and Remote Sector interference information seen by Panel 2. If this is the case, the coordination program may take the maximum interference and coordinate based on this information.

In a preferred implementation, an explicit start time is not included in the messages, because it is implied that start time will always be the next $T_o$ after the acknowledgement is received. However, in an alternative embodiment, an explicit start time may be communicated and set in the Demand Info Rx or Tx as the next integer second (or some set number of seconds, e.g., 5 seconds) based on, for example, the global GPS second system.

Once communication is established, and interfering sectors are identified (e.g., A7 and B0), the desired sector utilization rate for the panels (e.g., Panel A and Panel B) competing for the time slots on the interfering sectors is exchanged between the panels. For example, if Panel A and Panel B each desire to transmit data along sector A7 and B7, respectively, the two panels will exchange data (e.g., an integer value) corresponding to the demand for that sector.

Coordination

The processor implemented coordinating programs described herein schedule data transmission and/or reception (including phase selection) within time slots to avoid the contention of data, which enables the operation of more than one panel device in a panel system at a given frequency, without interference. As described above, the panels exchange each of their demands for the conflicting sectors, indicating how much time they need to use the conflicting sectors. Using the exchanged time-based demands, the processors of the respective panels may run the coordinating programs of the invention to dynamically adjust sector usage without requiring transaction by transaction negotiation. The pseudo-real-time demand information exchange between panels thus allows for real-time adjustments based on sector demand.

In one embodiment, the sharing or coordination of time slots within conflicting sectors is scheduled based on "time on the air." This means that if, for example, two panels have equal demands on the conflicting sectors, they will evenly share time regardless of modulation. For instance, if two panels have an equal time demand, then a panel with 6 mbps links on the correlated sectors will get 3 mbps and a panel with 18 mbps links will get 9 mbps. Alternatively, the coordination can account for modulation and data transmission.

A more preferred embodiment is now discussed and is further described in Equations 1 and 2, below. As shown, each panel (Panel A and Panel B) determines a rate at which integer boundaries are crossed, and transmits and/or receives at calculated time slots. The calculation is typically based on an integer counter (i), which is first multiplied by a first panels' time demand value ("TA(i.e., the time Panel A needs to use the conflicting sector). This value is then divided by the sum of the time demands of the first panel ("TA") and second panel ("TB"). The second panel (Panel B) performs the same calculation, and the panels employ the computed counter values that do not cross an integer boundary.

Panel A transmits and/or receives when: the intger value of $(T_A*i)/(T_A+T_B)$ is not equal to the integer value of $(T_A*(i-1))/(T_A+T_B)$; where $i=0, 1, 2, 3$, etc.   Equation 1

Panel B transmits and/or receives when: the intger value of $(T_A*i)/(T_A+T_B)$ is equal to the integer value of $(T_A*(i-1))/(T_A+T_B)$; where $i=0, 1, 2, 3$, etc.   Equation 2

Generally, the time demand values ($T_A$ and $T_B$) are normalized (e.g., percent of total time required*100, or number of slots needed out of 100). For instance, a panel with only traffic on a conflicting sector, but that only has 50% load, could send data during 50 out of 100 time slots (i.e., normalized over 100), while another panel with 100% utilization but only 25% on the conflicting sector would send data along that sector during 25 out of the 100 possible time slots.

In one particular example, if Panel A requires sector A7 25% of the time, and Panel B requires sector B0 50% of the time, Panel A would have opportunities to use time slots 1, 3, 6, 9, 12, etc., while Panel B would be able to use time slots 2, 4, 5, 7, 8, 10, 11, etc. To fairly distribute the time, multiple slot beats will count as multiple uses (e.g., a 1600 µs transmission would count twice as much as a 800 µs transmission).

The coordinating programs described herein may be used to assign time slots based solely on demand, without regard to fairness. However, in alternative embodiments, fairness may be considered. For instance, if one panel needs a conflicting sector 100% of the time, and another panel needs the corresponding conflicting sector 50% of the time, the results of the program may assign ⅔ of the time slots to the first panel and ⅓ of the time slots to the second panel, rather than ½ and ½. While this may seem unfair, the panels are assumed to be part of the same system, so there is no reason why traffic on a lightly utilized panel should be preferred over traffic on a highly utilized panel.

In one embodiment, the coordinating program enables the panels to grant recurring time slots, which means that panels can be granted extended rights to communicate using a given sector during certain time slots. This is useful for providing higher classes of service for applications like Voice over IP (VoIP).

While the coordinating process described above is performed in a distributed fashion, the invention is not so limited. Alternatively, systems are envisioned wherein a single processor on a panel is designated as the master and performs scheduling for all panels in the panel system. And in a further embodiment, a wholly separate processor may be employed to perform the coordinating processes.

Figure 3:
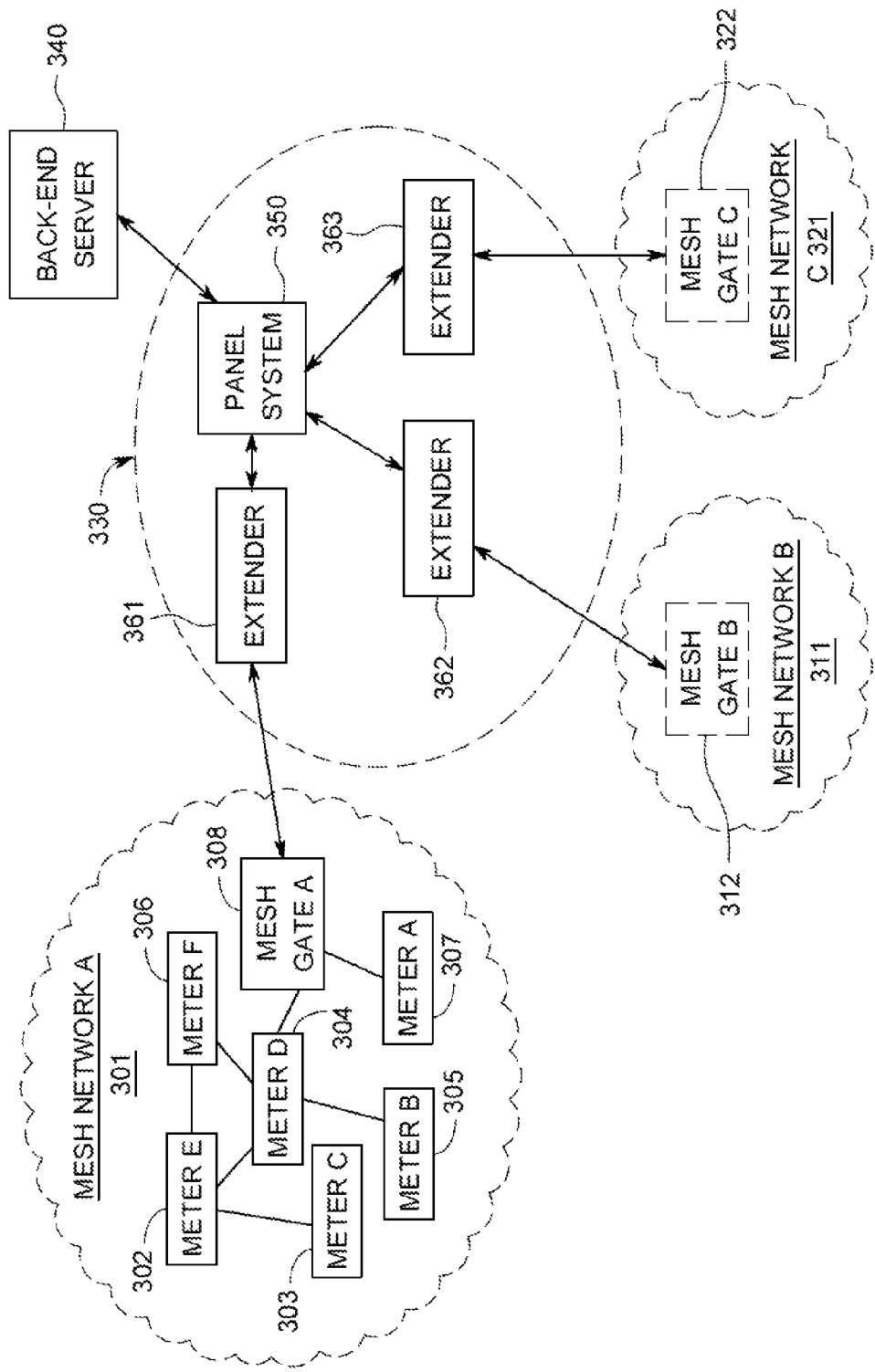
FIG. 3 illustrates an exemplary network configuration including a panel system of the invention in connection with NAN mesh networks.

Referring to FIG. 3, a schematic illustrates an exemplary implementation of a panel system 350 within a larger wide area network (WAN) system 330. The panel system 350 communicates with multiple mesh networks (301, 311, 321), also called neighborhood area networks (NANs). As shown with respect to mesh network A 301, each of the NANs comprises multiple nodes, such as but not limited to, meters (302-307) and at least one mesh gate 308. Mesh networks B 311 and C 321 are also shown in communication with the WAN system 330 through their respective mesh gates (312, 322).

It will be appreciated that the mesh gates (308, 312, 322) are the access points to the meters (e.g. 302-307) within their individual mesh networks and bridge their individual mesh networks to the WAN 330. A mesh gate may also be referred to as an access point or a Neighborhood Area Network to Wide Area Network (NAN-WAN) gate. The mesh gate may perform anyone or more of many different functions including, for example, but not limited to, one or any combination of: relaying information from a server (such as to a back end server 340) to the mesh network nodes, routing information, aggregating information from the nodes within any sub-network that may be configured for transmission to a server (such as to the back end server), acting as a home area network (HAN) sometimes also referred to as a premise area network (PAN) coordinator, acting as a NAN-WAN gate, transmitting firmware upgrades, and/or multicasting messages. The mesh gate may also be referred to as a collector because it collects information from the NAN-associated nodes or other nodes in its subnetwork. A mesh gate may include a mesh radio to communicate with mesh devices over the mesh network and a WAN communication interface to communicate with the Panel System 350.

The mesh gate may provide a gateway between the mesh network A and a server 340. The server 340 can also act as a back end. The server 340 can provide services to mesh devices, such as commissioning devices, providing software updates, providing metering pricing updates, receiving metering information, etc. The mesh gate may aggregate information from mesh devices (e.g., meters) within the mesh network and transmit the information to the server 340. The mesh gate may further forward messages from the mesh devices to the server 340, for example, status reports and meter readings. The mesh gate may further forward messages from the server 340 to the mesh devices, for example, instructions and queries. The server 340 may be a computing device configured to receive information, such as meter readings, from a plurality of mesh networks and meters. The server 340 may also be configured to transmit instructions to the mesh networks, mesh gates, and meters. It will be appreciated that while only one server is depicted, any number of servers may be used. For example, servers may be distributed by geographical location. Redundant servers may provide backup and failover capabilities in the AMI system.

The extenders 360, in combination with the panel system 350, extend the reach of the mesh gates (308, 312, 322) and relay information to/from the NANs (301, 312, 322) through the WAN 320 to the back-end server(s) 340. The extenders 360 may demand slots from panel system 350.

While FIG. 3 illustrates three mesh networks (301, 311, 321), each with a single mesh gate (308, 312, 322) communicating with a respective one of extenders (361, 362, 363), the invention is not so limited, and there need not be such a 1:1 ratio of mesh gates to extenders. Rather, multiple mesh gates (308, 312, 322) may communicate with a single extender 360. Similarly, information from a single mesh gate (308, 312, 322) may hop across multiple extenders (361, 362, 363) before reaching the panel system 350. Further still, the WAN 330 may comprise any number of panel systems 350. In one embodiment, the nodes that make up the WAN 330 may communicate using IEEE 802.11 b, g, and/or n physical and link layer standards.

Figure 4:
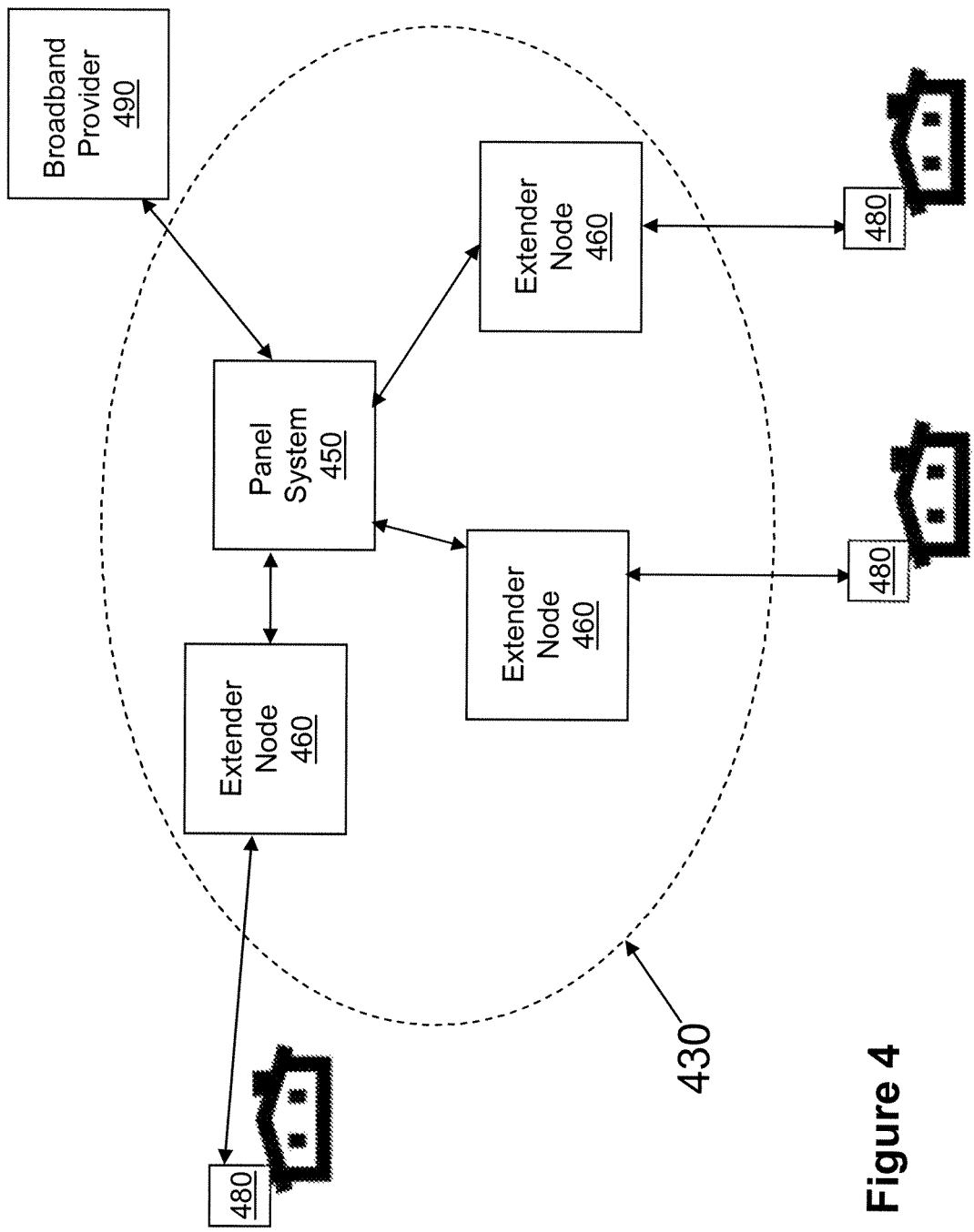
FIG. 4 is an exemplary overall system configuration including a panel system of the invention in communication with broadband antennas.

Referring to FIG. 4, an exemplary use for the panel system 450 is illustrated. As shown, a WAN 430 comprises a panel system 450 in communication with multiple extenders 460. The WAN 430 is in communication with a broadband provider 490, which provides broadband internet service to customers. The broadband provider 490 communicates with broadband antennas 480 located at individual customer premises through the WAN 430. Specifically, the panel system 450 may is employed to transmit and/or receive data to/from each of the broadband antennas 480.

Figure 5:
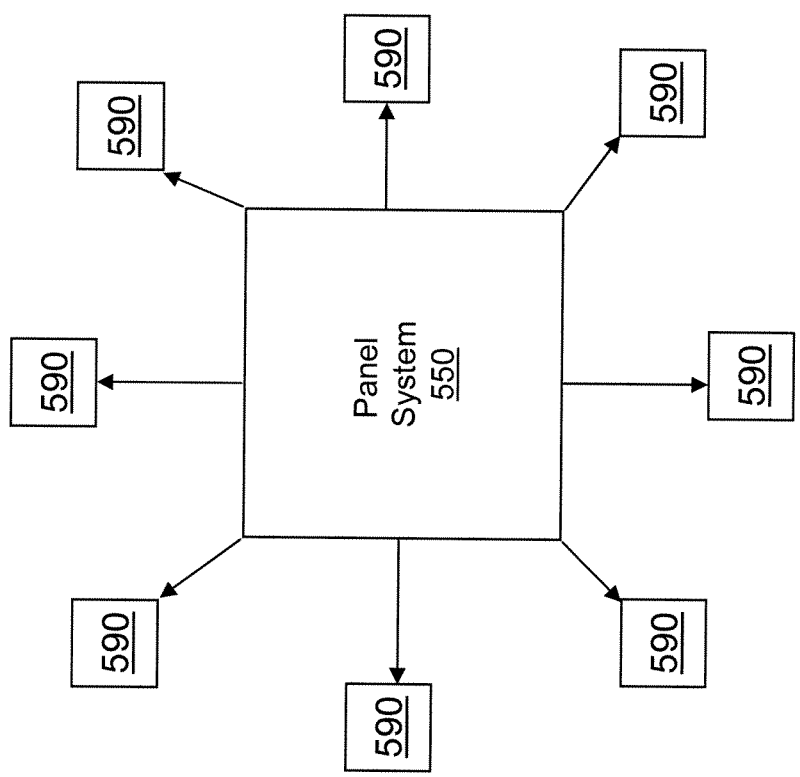
FIG. 5 is an exemplary overall system configuration including a panel system of the invention in communication with connectors for enabling wireless connectivity.

Referring to FIG. 5, another exemplary use for the panel system 550 is illustrated. As shown, a plurality of directional connectors 590 are disposed around the panel system 550 to provide internet capabilities to consumers. In one embodiment, the multiple directional connectors 590 may be coordinated such that they may provide 360 degree omnidirectional transmission and/or reception capabilities without substantial intra-system interference.

In certain embodiments, panels having conflicting sectors will divide time slot usage regardless of whether the sector is needed for upstream or downstream communications. In these embodiments, the panel to extender (FIGS. 3 and 4) and panel to coordinator (FIG. 5) communications protocol is typically limited to bi-directional data exchanges, meaning there is no ability to share time slots based on Tx/Tx or Rx/Rx due to the lack of unidirectional sectors in the MAC layer. Of course, the invention is not so limited. For systems wherein the communications protocol is unidirectional (i.e., certain sectors are designated for transmitting or receiving only), the sectors may be shared such that separate data packets may be transmitted simultaneously along the same Tx sector, essentially sharing the sector, and similarly, separate data packets may be received simultaneously from the same Rx sector, essentially sharing the sector.

Further, in certain embodiments, the panel systems and/or children thereto (e.g., extenders, connectors, etc.) may be programmed in various ways in order to implement a preferred panel process, wherein if the specified panel is available, a child will connect through it. Otherwise, the child will connect via the best route, according to its normal frequency and domain algorithm to a next best panel. Identification of the preferred panel may be by its MAC address. Further still, information regarding the level of sector interference and/or sector availability may be shared between panel systems and/or children such that there is efficient use of sectors and minimization of interference, where possible. For example, in a specific scenario, individual panels may recognize sector availability and implement a process for initiating communication with a child that might otherwise be communicating via an interfering sector of the panel in a shared configuration.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

Some exemplary embodiments described herein are described as software executed on at least one computer, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

I claim:

1. A panel system comprising:
a first panel device comprising a first processor, a transmitter, and a receiver, the first panel device capable of transmitting and/or receiving a first beam along a first sector chosen from a plurality of first sectors defining a first beam arc; and
a second panel device co-located with the first panel device comprising a second processor, a transmitter, and a receiver, the second panel device capable of transmitting and/or receiving a second beam along a second sector chosen from a plurality of second sectors defining a second beam arc;
wherein the first sector is located such that the transmitting and/or receiving of the first beam by the first panel device along the first sector would interfere with the transmitting and/or receiving of the second beam by the second panel device along the second sector; and
wherein the first processor and the second processor are configured to communicate with each other via the first panel device and the second panel device, respectively to exchange time-based demand requirements of signal transmission or reception for at least one of the transmitter and receiver of each of the first panel device and second panel device, and in response to processing of the demand requirements, determine a schedule in the time domain for a plurality of future time slots to be available for the exclusive use by a respective one of the first and second panel devices for the at least one of future transmitting or receiving, said schedule being determined by a ratio $(T_A)/(T_A+T_B)$, where, $T_A$ and $T_B$ are the exchanged time-based demand requirements of the first and second panel devices, respectively, so as to prevent the future transmitting and/or receiving of the second beam along the second sector when the first panel device is transmitting and/or receiving the first beam along the first sector.

2. A system according to claim 1, wherein the second panel device is not prevented from transmitting and/or receiving along any of the plurality of second sectors that do not interfere with the first sector.

3. A system according to claim 1, wherein the first panel device and/or second panel device comprises an array of antenna elements.

4. A system according to claim 1, wherein the first panel device and/or second panel device is a directional antenna.

5. A system according to claim 1, wherein the plurality of future time slots are coordinated in an interleaved manner, so that time slots for at least one of signal transmission or reception in the first sector are interleaved in time with time slots for at least one of signal transmission or reception in the second sector.

6. A system according to claim 1 further comprising a third panel device located adjacent to the first panel device comprising a third processor, a transmitter, and a receiver, the third panel device capable of transmitting and/or receiving a third beam along a third sector chosen from a plurality of third sectors defining a third beam arc;
wherein a different first sector among the plurality of first sectors is located such that the transmitting and/or receiving of a different first beam by the first panel device along the different first sector would interfere with the transmitting and/or receiving of the third beam by the third panel device along the third sector; and
wherein the first panel device and third panel device are coordinated by at least one of the first processor and the third processor in the time domain according to the ratio $(T_A)/(T_A+T_C)$, where, $T_A$ and $T_C$ are exchanged time-based demand requirements of the first and third panel devices, respectively, to prevent the transmitting and/or receiving of the third beam along the third sector by the third panel device when the first panel device is transmitting and/or receiving the different first beam along the different first sector.

7. A system according to claim 6, wherein the third panel device is not prevented from transmitting and/or receiving along any of the plurality of third sectors that do not interfere with the different first sector.

8. A system according to claim 6 further comprising a fourth panel device located adjacent to the second panel device and the third panel device comprising a fourth processor, a transmitter, and a receiver, the fourth panel device capable of transmitting and/or receiving a fourth beam along a fourth sector chosen from a plurality of fourth sectors defining a fourth beam arc;
wherein a different second sector among the plurality of second sectors is located such that the transmitting and/or receiving of a different second beam by the second panel device along the different second sector would interfere with the transmitting and/or receiving of the fourth beam by the fourth panel device along the fourth sector; and
wherein the second panel device and fourth panel device are coordinated by at least one of the second processor and the fourth processor in the time domain according to the ratio $(T_B)/(T_B-T_D)$, where, $T_B$ and $T_D$ are exchanged time-based demand requirements of the second and fourth panel devices, respectively, to prevent the transmitting and/or receiving of the fourth beam along the fourth sector by the fourth panel device when the second panel device is transmitting and/or receiving the different second beam along the different second sector.

9. A system according to claim 8, wherein the fourth panel device is not prevented from transmitting and/or receiving along any of the plurality of fourth sectors that do not interfere with the different second sector.

10. A system according to claim 8, wherein the first sector does not interfere with any of the third plurality of sectors or any of the fourth plurality of sectors, and wherein the different first sector does not interfere with any of the second plurality of sectors or fourth plurality of sectors.

11. A system according to claim 1, wherein at least one of the plurality of first sectors does not interfere with at least one of the plurality of second sectors.

12. A system according to claim 8, further comprising a synchronized clock shared by the first, second, third and fourth panel devices.

13. A system according to claim 1 wherein the plurality of future time slots are scheduled so that pre-determined recurring time slots are reserved for use by a given panel device.

14. The system according to claim 1, wherein:
the first panel device is scheduled to at least one of future transmit or receive when the integer value of the calculation of $(T_A*i)/(T_A+T_B)$, where i is an integer, is not equal to the integer value of the calculation of $(T_A*(i-1))/(T_A+T_B)$, and
the second panel device is scheduled to at least one of future transmit or receive when the integer value of the calculation of $(T_A*i)/(T_A+T_B)$, where i is an integer, is equal to the integer value of the calculation of $(T_A*(i-1))/(T_A+T_B)$.

15. A transceiver system comprising:
multiple co-located transceiver devices, each transceiver device including an M×N matrix of elements as part of a panel device, where M and N represent a number of columns and rows, respectively, such that the M×N matrix of elements defines a predetermined number of individual sectors of an array antenna, where signal transmission or reception in a first sector of the predetermined number of individual sectors by a first transceiver device of the multiple co-located transceiver devices would interfere with signal transmission or reception in a second sector by a second transceiver device of the multiple co-located transceiver devices; and
at least one processor of each of the first and second transceiver devices are programmed to communicate with each other via a respective one of a first and second panel device, to exchange signal transmission or reception time-based demand requirements for the at least first and second sectors, and in response to processing of the demand requirements, schedule in the time domain a plurality of future time slots using a ratio $(T_A)/(T_A+T_B)$, where, $T_A$ and $T_B$ are the exchanged time-based demand requirements of the first and second panel devices, respectively, for at least one of future signal transmission and/or reception in the first and second sectors, in order to avoid signal interference of use in the time domain.

16. The transceiver system according to claim 15, further comprising a synchronized clock shared by the multiple co-located transceiver devices.

17. The transceiver system according to claim 15, wherein the at least one processor of each of the first and second transceiver devices schedules the plurality of future time slots so as to interleave time slots for at least one of signal transmission or reception in the first sector with time slots for at least one of signal transmission or reception in the second sector.

18. The transceiver system according to claim 15 wherein the plurality of future time slots are scheduled so that pre-determined recurring time slots are reserved for use by a given transceiver device.

19. The transceiver system according to claim 15, wherein:
the first panel device is scheduled to at least one of future transmit or receive when the integer value of the calculation of $(T_A*i)/(T_A+T_B)$, where i is an integer, is not equal to the integer value of the calculation of $(T_A*(i-1))/(T_A+T_B)$, and
the second panel device is scheduled to at least one of future transmit or receive when the integer value of the calculation of $(T_A*i)/(T_A+T_B)$, where i is an integer, is equal to the integer value of the calculation of $(T_A*(i-1))/(T_A+T_B)$.

20. A process for scheduling sector use across multiple antenna panels comprising:
receiving by at least a first processor of a first antenna panel, an indication that reception and/or transmission of a first communication signal at a first sector of the first antenna panel would interfere with reception and/or transmission of a second communication signal at a second sector of a second antenna panel; and
receiving by at least a second processor of the second antenna panel, an indication that reception and/or transmission of the second communication signal at the second sector of the second antenna panel would interfere with reception and/or transmission of the first communication signal at the first sector of the first antenna panel; and
coordinating by and between the at least a first and second processors to exchange signal transmission and/or reception time-based demand requirements, and in response to such exchange, determining a schedule in the time domain of a plurality of future time slots for the transmission and/or reception of the first and second communication signals at the first and second sectors, said schedule being determined by a ratio $(T_A)/(T_A+T_B)$, where, $T_A$ and $T_B$ are the exchanged time-based demand requirements of the first and second antenna panels, respectively, so as to avoid signal interference therebetween.

21. The process according to claim 20, wherein coordinating comprises exchanging between the first and second processors use data for the first and second sectors.

22. The process according to claim 20 wherein the plurality of future time slots are scheduled so that pre-determined recurring time slots are reserved for use by a given antenna panel.

23. The process according to claim 20, wherein:
the first antenna panel is scheduled to at least one of future transmit or receive when the integer value of the calculation of $(T_A*i)/(T_A+T_B)$, where i is an integer, is not equal to the integer value of the calculation of $(T_A*(i-1))/(T_A+T_B)$, and
the second antenna panel is scheduled to at least one of future transmit or receive when the integer value of the calculation of $(T_A*i)/(T_A+T_B)$, where i is an integer, is equal to the integer value of the calculation of $(T_A*(i-1))/(T_A+T_B)$.

* * * * *